Sept. 3, 1946.   C. A. MARIEN ET AL   2,406,844
PISTON RING
Filed July 12, 1943
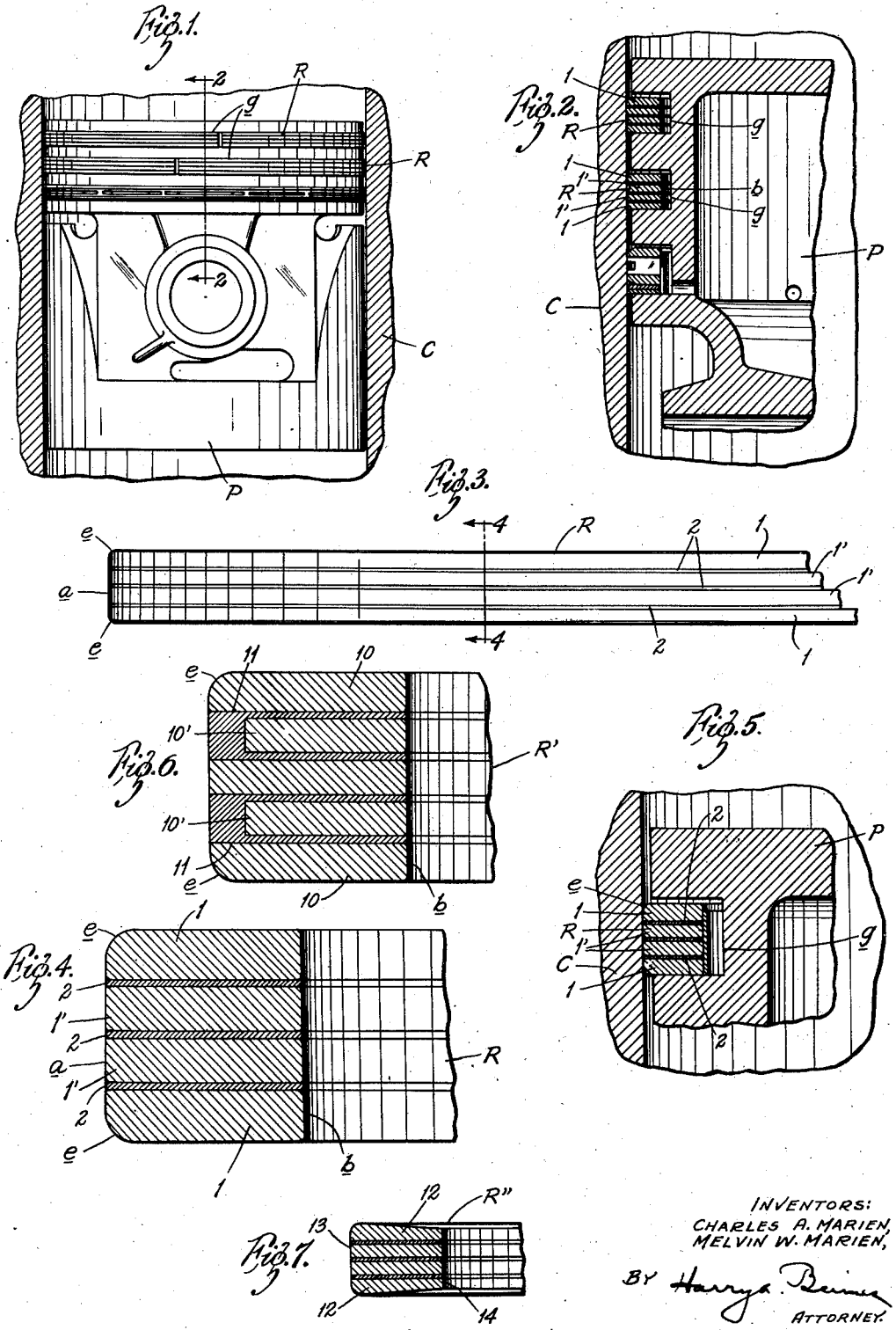
INVENTORS:
CHARLES A. MARIEN,
MELVIN W. MARIEN,
BY Harry A. Bernes
ATTORNEY.

Patented Sept. 3, 1946

2,406,844

UNITED STATES PATENT OFFICE 2,406,844

PISTON RING

Charles A. Marien and Melvin W. Marien, St. Louis, Mo., assignors to Ramsey Accessories Manufacturing Corporation, St. Louis, Mo., a corporation of Missouri Application July 12, 1943, Serial No. 494,292

13 Claims. (Cl. 309—44)

Our invention has relation to improvements in piston packing rings and it consists in the novel features of construction more fully set forth in the specification and pointed out in the claims.

The invention consists essentially in forming a one-piece piston ring of annular laminations of two or more metals arranged in alternation; that is, any two juxtaposed laminations will be of different metals having widely separated degrees of hardness.

In the manufacture of internal combustion engines cast iron has always been considered the ideal material for piston rings because of its strength, resilience and wearing in qualities. However, in recent years steel has been used to some extent, especially in combination with cast iron. Another expedient that has recently been adopted is the coating of the working face of the rings with a comparatively soft metal such as tin or cadmium which wears off during the breaking in period and permits the quick seating of the ring and prevents scuffing of the rings and cylinder wall. Another advantage of the softer coating is that it enters into the small pits or scratches scored in the cylinder because of dust particles, carbon or scanty lubrication. However this coating of soft metal is only a few thousandths of an inch in thickness and soon wears off bringing the cast iron of the ring in direct contact with the cylinder wall.

We have sought to make permanent the advantages of a soft metal coating by incorporating such metal into the ring construction so that it is available throughout the entire life of the piston ring to serve as a metallic lubrication. The manner in which we accomplish this object will be better apparent from a detailed description of the invention in connection with the accompanying drawing, in which:

Fig. 1 is a side elevation of a piston showing our improved ring in the top and the middle ring grooves; Fig. 2 is an enlarged longitudinal section through the head of the piston showing our improved rings in cross-section; Fig. 3 is an enlarged face view of a fragment of the ring; Fig. 4 is a further enlarged cross-section taken on the line 4—4 of Fig. 3; Fig. 5 is section through the upper part of the piston head showing the top groove fitted with our improved ring and an expander spring; Fig. 6 is a modification of the invention in which an increased amount of the softer metal is provided at the face of the ring; Fig. 7 is a further modified form of the invention in which a wedge-shaped type of ring adapted for use in airplane engines is shown.

Referring to the drawing, P represents a piston operable in a cylinder C, the two upper grooves $g$, $g$ of said piston being equipped with our improved piston ring R.

The ring R is built up of a series (in the present case four) of steel or cast iron segments $1$, $1$, $1'$, $1'$ sweated or soldered together by thin layers $2$, $2$, $2$ of softer metal, such as tin, cadmium or a suitable solder. There are several ways in which the layers $2$ may be formed. For instance, the side faces of segments $1$ may be coated with solder, dipped in a bath of tin, cadmium or other metal having kindred physical properties, or the segments may be plated with the softer metal. After the segments $1$, $1'$ have thus been prepared with the coatings of the softer metal they are arranged in a pile and subjected to pressure and heat. The heat should be just sufficient to fuse the coatings whereby, under the pressure applied, the adjacent coatings flow together to form a layer $2$ securely joining the juxtaposed segments $1$, $1'$ or $1'$, $1'$ to form an integral ring R.

The solder or metal used to form the layers $2$ should preferably have a melting point below the temperature at which the temper of the steel will be seriously impaired. In the steel used for piston rings this temperature is between 800 deg. and 1100 deg. F. At the same time the melting temperature of the metal composing the layers $2$ should not be below that to which the piston ring is subjected in operature which is between 300 deg. and 600 deg. F. These temperatures are subject to considerable variation as many factors enter into their determination.

Among the metals suitable for the layers $2$ are tin, cadmium and zinc; and among the solders are silver-cadmium, and zinc-cadmium solders. Additional metals and alloys having properties suitable for the layers $2$ may be determined experimentally.

After the segments $1$, $1$, $1'$, $1'$ have been joined as above explained to form an integral ring R the face $a$ and the back $b$ thereof are machined to size and smooth surfaces produced free from excess solder or other metal.

Thus the ring R presents to the wall of cylinder C a bi-metallic surface throughout the entire life of the ring no matter how much of the ring is worn away by use, and the softer metal of the layers $2$ is always available to heal score marks in the cylinder wall. The outer edges $e$, $e$ of the ring R may be rounded, as shown, or they may be square or beveled as desired.

In Fig. 6 we show a modified form of ring R' in which outer and middle segments $10$, $10$, $10$ are of greater radial thickness than intermediate segments $10'$, $10'$, and are of greater outside diameter so as to provide narrow annular channels 11, 11. These channels are filled with the same metal composing the layers 2 so that an abundance of the softer metal will be available during the breaking in of the ring. When the segments 10 have worn to the same diameter as segments 10' the ring R' will be thoroughly broken in.

In Fig. 7 we show a wedge-shaped ring R'' suitable for certain types of airplane engines. This ring is similar in construction to the ring R except that the outer segments 12, 12 are slightly wedge-shaped so that the ring is wider at its face 13 than back surface 14.

In the operation of our improved ring the cast iron or steel segments 1, 1, 1', 1' serve primarily as the packing elements of the ring for holding the compression within the cylinder, while the softer layers (or segments) therebetween serve as the healing antiscuffing or media for any injuries or damage to the cylinder wall during the operation of the piston P.

Obviously, but a small amount of the healing material need be provided. Therefore a typical ring for a 1/8" groove may be composed of four segments each having a thickness of .0295" while the thickness of the healing media between adjacent segments is approximately .003". In the finishing operations the sides of the ring are dressed down to proper size. These dimensions are not critical but are merely given as an example. The number of segments and the thickness thereof may also be varied through wide limits to apply the piston ring R to all sizes of piston ring grooves, and the thickness of the bonding material may also be varied.

A piston ring embodying the present invention has unusual strength due to the laminated construction, and is not subject to breakage caused by foundry defects as is cast iron, not flaws as is often the case with solid steel rings.

Having described our invention, we claim:

1. A composite piston ring comprising at least two superposed annular metallic segments permanently joined into an integral structure by a cohering metallic substance lower in the scale of hardness than the segments.

2. A composite piston ring comprising a plurality of superposed annular metallic segments of two different materials having different degrees of hardness, said segments being arranged in alternation, the segments of the softer material serving as a permanent bond for the segments of the harder material whereby a coherent integral structure is formed.

3. A piston ring composed of a plurality of superposed annular metallic segments and a bonding material between the segments to form a permanent coherent integral structure.

4. A piston ring composed of a plurality of superposed annular metallic segments and a metallic bonding material between the segments to form a permanent composite integral ring structure, said bonding material being lower in the scale of hardness than the segments.

5. A piston ring composed of a plurality of superposed segments of a ferrous metal and a permanently bonding material of a non-ferrous metal therebetween.

6. A piston ring composed of superposed iron or steel annular segments soldered together to form a permanent coherent integral structure.

7. A composite piston ring built up of superposed layers of a ferrous metal and of a non-ferrous metal in alternation and in permanently bonded relation.

8. A composite piston ring built up of superposed layers of a ferrous metal and of a non-ferrous metal in alternation and in permanently bonded relation, the non-ferrous metal being lower in the scale of hardness than the ferrous metal.

9. A piston ring comprising superposed laminations of ferrous and non-ferrous metals permanently bonded together by the cohesion of the metals, the non-ferrous metal being lower in the scale of hardness than the ferrous metal.

10. A piston ring comprising laminations of ferrous and non-ferrous metals permanently bonded together by the cohesion of the metals, the non-ferrous metal being lower in the scale of hardness than the ferrous metal and having a melting point below that necessary to appreciably draw the temper from the ferrous metal and above the temperature to which the ring is subjected in operation.

11. A composite piston ring built up of layers of a ferrous metal and of a non-ferrous metal in alternation and in permanently bonded relation, the non-ferrous metal being lower in the scale of hardness than the ferrous metal, some of the ferrous layers being of less outside diameter than others whereby annular recesses are formed in the face of the ring, and a non-ferrous metallic filling in said recesses.

12. A piston ring composed of superposed annular segments of a ferrous metal, and a bonding material of a non-ferrous metal between and permanently assembling said segments, the outer surfaces of the segments and bonding material collectively forming the gliding surface of the piston ring.

13. A piston ring comprising a plurality of steel laminations tempered to a hardness of the order of C 35 to C 50 Rockwell, a metallic bonding element uniting said laminations into a solid mass, said bonding element being substantially lower in the scale of hardness than the steel and having a melting point above 500° F.

CHARLES A. MARIEN.
MELVIN W. MARIEN.